(12) United States Patent
Bui et al.

(10) Patent No.: US 7,014,111 B2
(45) Date of Patent: Mar. 21, 2006

(54) HIGH SENSITIVITY READER FOR PASSIVE TRANSPONDERS

(75) Inventors: Ngoc-Chau Bui, Fontaines (CH); Christian Werner, Chez-le-Bart (CH); Yves Gaudenzi, La Chaux-de-Fonds (CH); Martial Benoit, Brot-Plamboz (CH); Vincent Cassi, La Sagne (CH); Christian Mirus, Belfaux (CH); Jean-Daniel Chatelain, Cottens (CH); Jacques Kowalczuk, Jougne (FR)

(73) Assignee: MBBS Holding S.A., Thielle-Wavre (CH)

( * ) Notice: Subject to any disclaimer, the term of this patent is extended or adjusted under 35 U.S.C. 154(b) by 163 days.

(21) Appl. No.: 10/333,300

(22) PCT Filed: Jul. 17, 2001

(86) PCT No.: PCT/CH01/00445

§ 371 (c)(1),
(2), (4) Date: Jun. 30, 2003

(87) PCT Pub. No.: WO02/09021

PCT Pub. Date: Jan. 31, 2002

(65) Prior Publication Data

US 2004/0178265 A1    Sep. 16, 2004

(30) Foreign Application Priority Data

Jul. 21, 2000    (FR) .................................. 00 09625

(51) Int. Cl.
*G06K 7/08*    (2006.01)

(52) U.S. Cl. ............ 235/451; 340/572.01; 340/572.04; 340/10.1

(58) Field of Classification Search ............. 340/572.1, 340/572.2, 572.4, 10.1; 235/451
See application file for complete search history.

(56) References Cited

U.S. PATENT DOCUMENTS 5,084,699 A * 1/1992 DeMichele .............. 340/10.34
6,154,635 A * 11/2000 Ohta .......................... 455/41.1

(Continued)

FOREIGN PATENT DOCUMENTS

GB    2 300 318    10/1996

(Continued)

OTHER PUBLICATIONS

"CID Demokit Application Note on Transceiver Unit" EM Microelectronic—Marin SA (Switzerland).

Primary Examiner—Daniel Stcyr
Assistant Examiner—Daniel A. Hess
(74) Attorney, Agent, or Firm—Young & Thompson (57) ABSTRACT

The invention concerns a reader (10) for identifying passive transponders (12) comprising an antenna for receiving a first signal (Tx) from the reader and for transmitting a second signal (Rx). The reader comprises: a time base (54) generating a sinusoidal signal, a control circuit (64), a modulator (56) for transmitting to the control circuit (64) data to modulate the sinusoidal signal so as to generate a signal carrying commands which, when it is received by the antenna of said transponder, forms said first signal (Tx), a demodulator (58), a decoder (60), a communication interface (62) and an antenna (14). The demodulator (60), which is connected to the antenna (14) to receive the second signal (Rx), comprises two multipliers (76, 78), one (78) being of the inverter type, and an adder (70) designed to combine the data derived from the multipliers (76, 78).

16 Claims, 5 Drawing Sheets

U.S. PATENT DOCUMENTS 6,307,468 B1 * 10/2001 Ward, Jr. .................... 340/505
6,362,738 B1 *  3/2002 Vega ....................... 340/572.1
2003/0021367 A1 *  1/2003 Smith ........................ 375/346

FOREIGN PATENT DOCUMENTS

WO    WO 99/67736    12/1999

* cited by examiner

HIGH SENSITIVITY READER FOR PASSIVE TRANSPONDERS

CROSS REFERENCE TO RELATED APPLICATIONS

Priority is claimed to PCT/CH01/00445 filed Jul. 17, 2001, which claims priority to France 00/09625 filed Jul. 21, 2000.

FIELD OF INVENTION

The present invention relates to a reader for identifying passive transponders of the type comprising an antenna arranged for receiving a first signal Tx from the reader and for transmitting a second signal Rx to the reader. It concerns more particularly readers allowing reception of low intensity signals.

SUMMARY OF THE INVENTION

Units comprising a reader and at least one transponder, and which allow contactless identification, are well known to those skilled in the art. They are based on the principle of electromagnetic coupling. One of them is, for example, disclosed by EM Microelectronic—Marin SA (Switzerland) under the title "CID Demokit Application note on transceiver unit".

The reader of this unit comprises an antenna and a control circuit which transmit a signal Lx formed of an amplitude modulated low frequency carrier, typically comprised between 9 and 150 kHz. They receive, in return, the signal Rx.

More precisely, the reader is also provided with a time base for generating the carrier signal, the carrier being modulated by the control signal, as well as with a demodulator for processing the picked up signals and with a microcontroller for decoding them. In the reader, a tuning capacitor is connected to the antenna to form a series resonating circuit, tuned to the frequency source.

The transponder receives from the reader the signal Tx, which corresponds to the damped signal Lx and which provides it, at the same time, with energy, commands and the clock. When the reader has finished addressing its commands, it continues to transmit the carrier signal, but without modulation. Consequently, the transponder is constantly supplied with energy and driven by the clock.

The transponder addresses signal Rx to the reader, by periodically short-circuiting its antenna in accordance with coded modulation that corresponds to the response to be given.

Rx is received superposed onto the carrier by the reader antenna. This combined signal is processed and decoded by the demodulator.

When the reader is separated from the transponder by a metal screen, the electromagnetic coupling no longer occurs directly between the two antennae of the reader and the transponder, but indirectly, through the metal screen in which induced currents (eddy currents) flow.

The coupling between the reader antenna and the transponder antenna then becomes very weak. Experience has shown that, in order to ensure a connection in such circumstances, the energy and modulation must be transmitted in a particularly efficient manner, and the demodulator must be very sensitive, capable of differentiating modulations in signals Rx of the order of 70 dB with respect to the carrier.

An object of the present invention is to propose a reader allowing such small modulations to be differentiated. Thus, the demodulator, connected to the antenna to receive the second signal that it picks up from the transponder arranged in the vicinity includes two signal multipliers, one being of the inverter type, and an adder for combining the data from these multipliers.

In an advantageous manner, the demodulator includes:
a first channel formed by the first multiplier,
a second channel arranged in parallel with the first channel and including the second multiplier, as well as a low pass filter and a sampling and hold circuit,
an adder, which receives the signals from the two channels and processes them,
an amplifier-filter, and
a comparator.

The demodulator is arranged such that the signals derived from the adder are processed by the amplifier-filter then by the comparator. They are then addressed to the interface to deliver, at the output thereof, a signal carrying information from the transponder.

Particularly when the reader is separated from the transponder by a metal screen, the inductance of the reader antenna has to be as high as possible (of the order of several mH) with a high magnetic field concentration. This can be obtained by coiling the reader antenna on a core of soft magnetic material, for example ferrite.

Reading must also not be dependent upon problems that could be generated by variations in the features of the reader antenna, for example its time constant. Therefore, the reader is arranged such that the beginning of the pause occurs by interrupting the current, and thus the magnetic field, during its zero crossing. The voltage across the terminals of the antenna or the tuning capacitor is then at a maximum and kept for the beginning of the next transmission.

The reader commands require all or part of the transponders present in the electromagnetic field to send an identification return signal Rx. They are in binary form, with a series of bits that differ from each other in length. A pause, as short as possible, is inserted between the bits.

More precisely, the reader transmits signal Lx, of constant amplitude, with a pause time $T_0$ or $T_1$, depending on whether it wishes to send a 0 or a 1, the ratio between $T_0$ and $T_1$ being substantially equal to ½. The pause times are reduced to a minimum, so that the energy provided is maximum and the measuring time as short as possible. The transponder antenna receives signal Tx, which is a damped image of signal Lx, the sinusoid decreasing, and then increasing progressively respectively when transmission of Lx stops and begins. This pause time must, therefore, be sufficient for signal Tx across the transponder antenna terminals to be damped to a voltage lower than the threshold voltage, in order to allow the demodulation circuit to detect it.

When a metal screen is capable of being located between the reader and transponder antennae, it is preferable to work at the lowest possible carrier frequency. This inevitably results in an increase in the pause duration.

It is also an object of the present invention to ensure a reliable connection between a reader and a transponder, in the shortest possible transmission time and to be able to work even with a metal screen arranged between the reader and the transponder. It allows, more particularly, the pause duration to be reduced to a minimum with respect to that of a command bit and to make the features of the transponder and reader antennae independent. The reader is thus arranged such that the first signal Tx, generated by the control circuit, is formed of a succession of bits each of them ending in a pause whose duration is less than or equal to six periods of the sinusoidal signal.

Other advantages and features of the invention will appear from the following description, made with reference to the annexed drawing, in which:

BRIEF DESCRIPTION OF THE DRAWINGS

FIG. 3 illustrates schematically at a and b, diagrams of the low and high level extractors.

DETAILED DESCRIPTION

Figure 1:
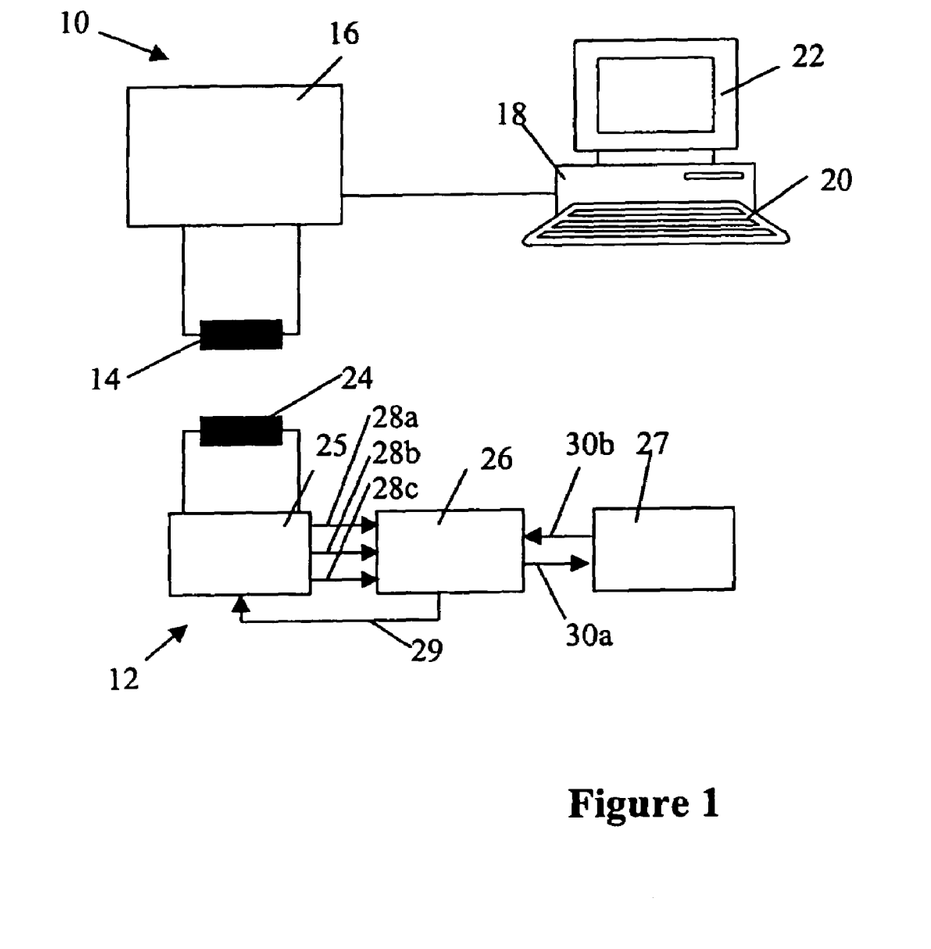
FIG. 1 shows schematically a transponder and a reader for identifying the transponder.

The unit, shown in FIG. 1, includes a reader 10 and a transponder 12. Reader 10 includes, more precisely, an antenna 14 transmitting an electromagnetic signal Lx, an electronic control circuit 16, advantageously a microcontroller, as well as a computer 18 connected to a keyboard 20 and to a screen 22.

Transponder 12 is formed of an antenna 24, an analogue circuit 25, a logic control circuit 26 and a memory 27. Analogue circuit 25, which will be described in more detail hereinafter, is connected to the antenna, to receive the signal picked up by the latter. This signal carries out three functions, namely it:

supplies the transponder with electric energy,
provides a clock signal, and
transmits commands.

After processing, the signal is transmitted from analogue circuit 25 to logic circuit 26, by three connections 28a, 28b and 28c, respectively ensuring the transmission of energy, the clock and the serial input function. Logic circuit 26 addresses data to analogue circuit 25, via connection 29 of the "serial output" type. It introduces and will search for data in memory 27, respectively via connections 30a and 30b.

The commands are processed by logic circuit 26 from the data received and that contained in memory 27. A response is addressed, by logic circuit 26, to analogue circuit 25 so that it sends a return signal to reader 10.

Figure 2:
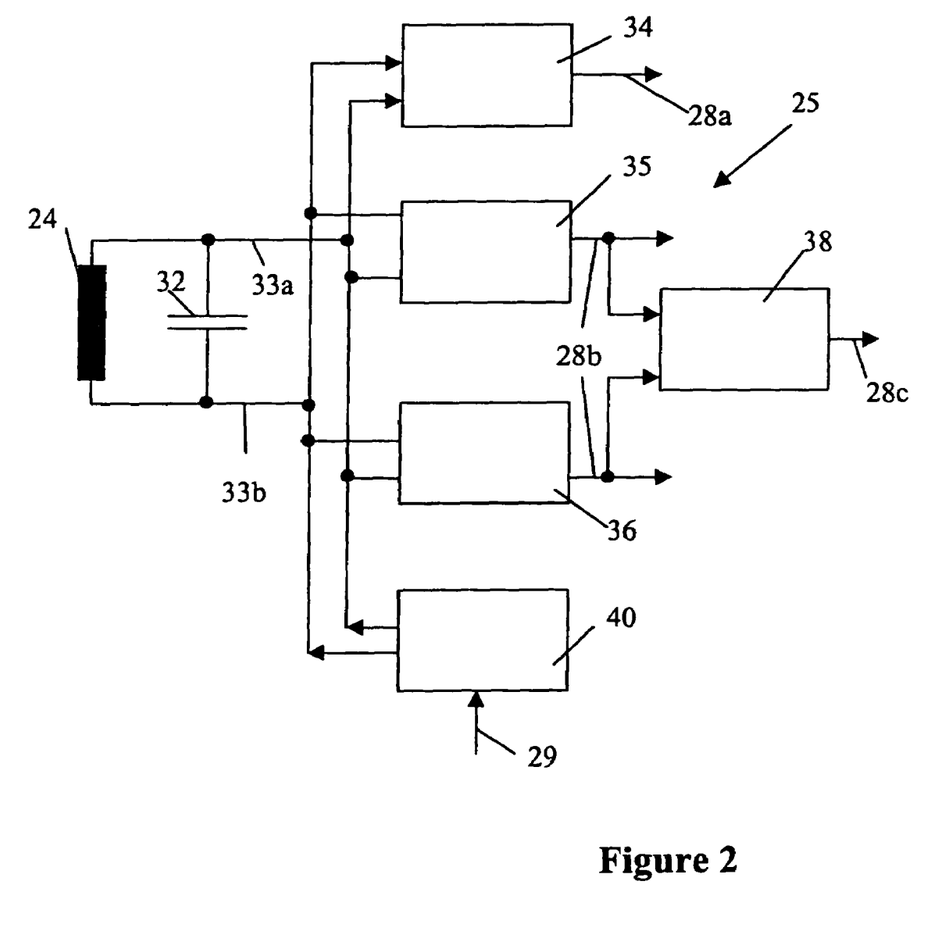
FIG. 2 shows a part of the transponder of FIG. 1, and more particularly its analogue circuit.

As FIG. 2 shows, analogue circuit 25 includes a capacitor 32, an AC-DC converter 34, a low level clock extractor 35 and a high level clock extractor 36, a demodulator 38 and a modulator 40.

Capacitor 32 forms, with antenna 24, a resonating circuit whose natural frequency is adjusted to the frequency of signal Lx transmitted by reader 10, and to whose terminals the inputs of converter 34, extractors 35 and 36, and the outputs of modulator 40 are connected, via connections 33a and 33b, such that the signal received by the transponder is applied to each of them and the signal transmitted by the transponder is applied to the antenna. Demodulator 38 receives, from antenna 24, its energy through converter 34, and the clock and commands through extractors 35 and 36.

This Figure again shows supply connection 28a, clock connection 28b and serial input connection 28c, forming the outputs of analogue circuit 25. Serial input connection 29, which allows data to be addressed from logic circuit 26 to analogue circuit 25, and more particularly to its modulator 40, will also be noted.

Converter 34 is, in a manner well known to those skilled in the art, formed of a full-wave rectifier with a large energy capacitor, powering a voltage stabilizer. It powers all of the parts of transponder 12.

Figure 3A:
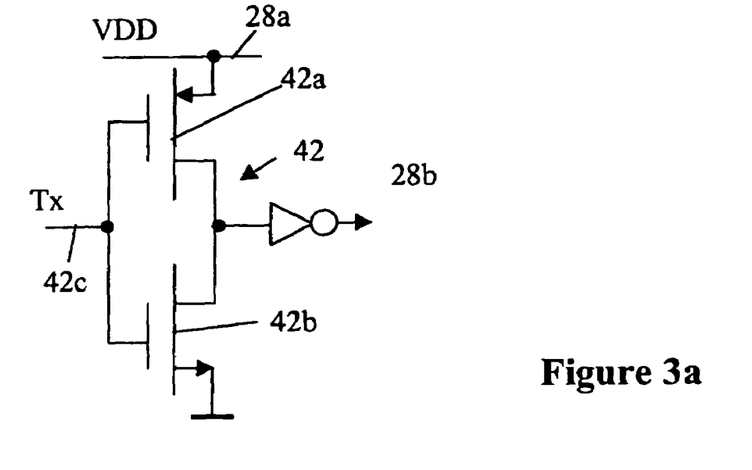

The low level type extractor is made by means of two simple inverters 42 and 43 in series, as shown in FIG. 3a. Inverter 42 is formed of a PMOS transistor 42a and a NMOS transistor 42b. It is powered by a stabilized voltage VDD provided by converter 34. Antenna 24 applies signal Tx to its input 42c. The dimensions of transistors 42a and 42b are calculated such that the threshold voltage Ub at which the circuit switches, is close to 1V.

An extractor of this type generates a clock signal each time that Tx is greater than 1V, this signal being interrupted when Tx descends below this level. Consequently, the clock signal is interrupted.

In normal operating conditions, the peak voltage $Tx_{max}$ is generally of the order of ten volts. With an antenna quality factor comprised between 15 and 30, approximately 3 to 6 cycles are required after the pause for voltage Tx to be permanently below 1V.

It would of course be possible to dimension the transistors such that threshold voltage Ub is higher. In this case, however, the transponder can no longer react normally when the received signal is close to Ub. This consequently reduces its sensitivity.

Figure 3B:
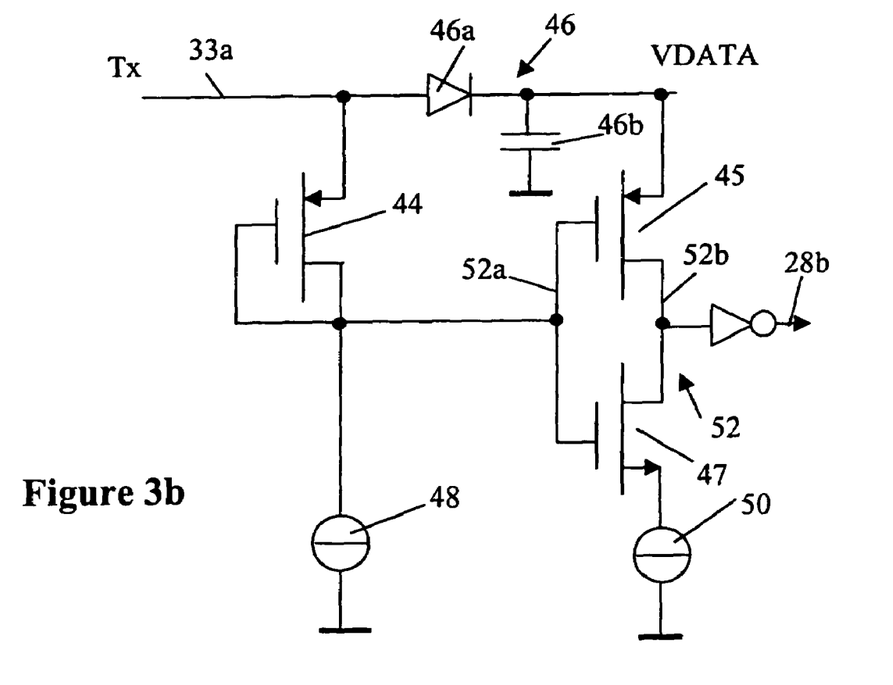

FIG. 3b shows in more detail the high level type extractor 36. It is formed of an input transistor 44, of the PMOS type and a peak value rectifier 46, both connected to the antenna by line 33a, of two current sources 48 and 50 and two inverters 52 and 53, one 52 being polarized, and the other 53 being simple.

More precisely, peak value rectifier 46 is formed of a diode 46a and a capacitor 46b. Its input is connected to antenna 24 by connection 33a and its output 46c to inverter 52 to apply a voltage VData thereto, equal to peak voltage $Tx_{max}$ of the signal received by the antenna through connection 33a.

Inverter 52 includes an input 52a and an output 52b, and two PMOS 52c and NMOS 52d transistors. Input 52a is connected to antenna 24 through transistor 44 which offsets the voltage of the antenna downwards by a value equal to its threshold value. Detection threshold Uh of the high level extractor is offset downwards with respect to VData by a value equal to the difference in the threshold voltages of PMOS transistors 44 and 52c. The latter are dimensioned such that the threshold voltage of transistor 52c is several hundred mV higher than the threshold voltage of transistor 44. Consequently, the clock signal is interrupted as soon as the voltage of signal Tx received by the antenna drops by a value equal to the difference between the two threshold voltages, whatever the value of peak voltage $Tx_{max}$.

Figure 4:
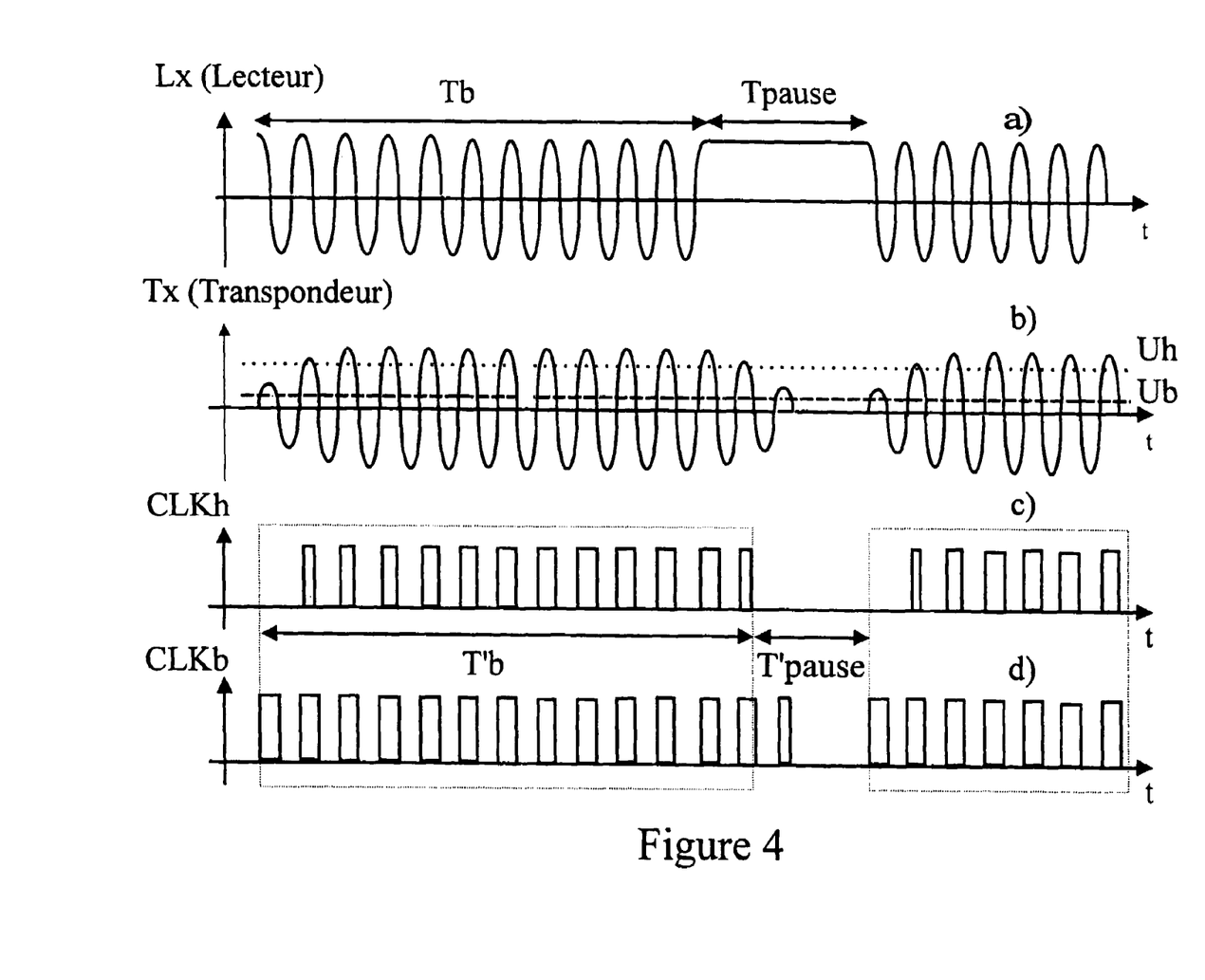
FIG. 4 shows respectively, on lines a to d, the voltage curves measured at the terminals of the reader antenna, the transponder antenna and the high and low clock signals.

In order to be able to understand properly the operation of the clock extractors, FIG. 4 shows schematically respectively on lines a, b, c and d, signal Lx transmitted by reader antenna 14, signal Tx received by transponder 12 and the high and low level clock signals CLKh and CLKb.

On line a, it will be noted that the reader antenna transmits a sinusoidal signal, which is periodically interrupted, when the voltage is maximum.

When the voltage of signal Lx becomes constant, signal Tx at the terminals of antenna 24 of transponder 12 decreases, as can be seen on line b, more or less quickly, the speed being lower the higher the quality factor. Peak voltage $Tx_{max}$ is higher, the higher the received signal. However, when the voltage exceeds a limit value, the signal is saturated.

At the start of a signal Lx transmitted by the reader, the high and low level clock signal extractors 36 and 35 both respond very quickly, as can be seen on lines c and d. However, in poor reception conditions, high clock signal CLKh may only appear after several periods of signal Lx transmitted by the reader. When reader 10 interrupts transmission of the sinusoidal signal, it will be noted that signal Tx received by antenna 24 is damped slowly. This is due to the fact that the quality factor of the oscillating circuit, that if forms with capacitor 32, is high.

Because of this slow damping, several periods are needed before low level extractor 35 reacts, whereas signal CLKh derived from high level extractor 36 is interrupted in synchronism.

It thus appears clearly that if the signal received is regular and intense, one need only have a high level extractor in the transponder in order to be able to considerably reduce the pause time. However, when the received signal is not saturated, it is then desirable to have high and low level extractors, which then allows a pause of short duration to be guaranteed. It is thus possible to transmit the maximum amount of energy and a significant number of data even when the carrier frequency is low.

Figure 5:
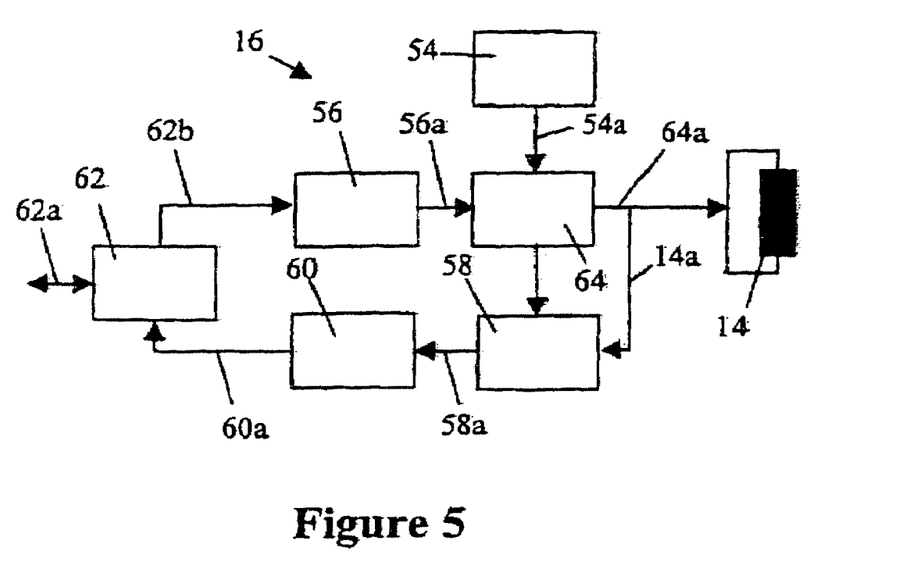
FIG. 5 shows schematically a reader according to the invention, a part of which is illustrated in more detail in FIG. 6.
Figure 6:
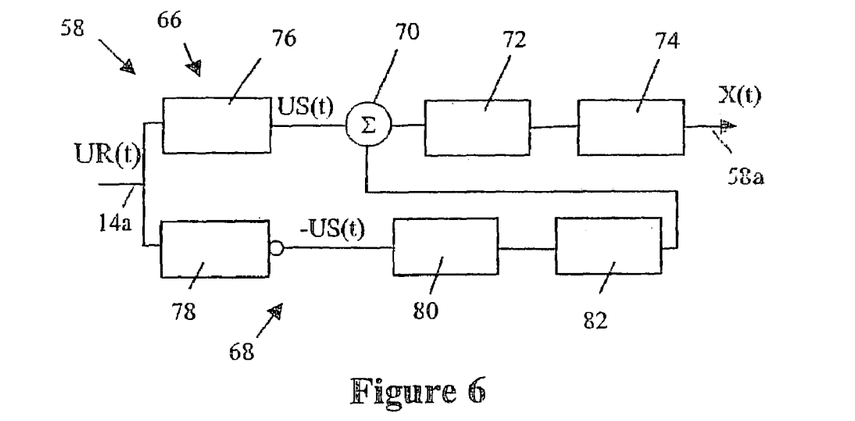

FIGS. 5 and 6 show, in more detail, the structure of electronic control circuit 16 fitted to reader 10.

Electronic control circuit 16 is formed of a time base 54, a modulator 56, a demodulator 58, a decoder 60, a communication interface 62 and a control circuit 64.

Time base 54 is connected to control circuit 64, by a connection 54a, through which it supplies a sinusoidal signal of constant frequency, advantageously comprised between 9 and 150 kHz, which acts as the carrier. Control circuit 64 receives from modulator 56, via a connection 56a, data which allow it to modulate the carrier signal to address data to a transponder arranged in proximity to the reader, via antenna 14 which is connected to control circuit 64 by means of a connection 64a.

Antenna 14 is connected to demodulator 58 by a connection 14a. Thus, when the transponder replies to the reader data, the signal that it addresses, picked up by antenna 14, is received by demodulator 58, through connection 14a. Demodulator 58 processes this signal and the data that it contains is addressed to decoder 60 through a connection 58a. Decoder 60 interprets this data on the basis of stored data and transmits it to interface 62 through a connection 60a. Interface 62 is connected to the exterior, by a connection 62a, formed for example of an RS line 232, to ensure the transmission of commands and data to man-machine interfaces. It is also connected to modulator 56, by a connection 62b.

Thus, when an operator wishes to identify an object provided with a transponder and arranged in the field of reader 10, he gives an order by means of keyboard 20. This order is managed by computer 18 and sent to electronic control circuit 16 via connection 62a. Interface 62 addresses this order to modulator 56. The latter co-operates with control circuit 64 to modulate the carrier signal derived from time base 54.

As has already been stressed hereinbefore, it is difficult to read the signals received by antenna 14, since they are of a very low level. Demodulator 58, shown in detail in FIG. 6, allows efficient reading to be ensured. It includes first and second channels 66 and 68, arranged in parallel, an adder 70 connected to the outputs of channels 66 and 68, an amplifier-filter 72 and a comparator 74 arranged in series at the output of adder 70.

Channel 66 is formed of a multiplier 76. Channel 68 includes an inverter type multiplier 78, a low-pass filter 80 and a sampling circuit 82.

The two channels 66 and 68 are together connected to the antenna by connection 14a. They therefore both receive the signal UR(t) originating from antenna 14. This modulated signal includes two components, one corresponding to the transmitted signal and the other to the picked up signal, originating from the transponder. Decoder 58 has the task of extracting the signal X(t) that corresponds to the component originating from the transponder.

In a first operation, the signal is multiplied by itself by multipliers 76 and 78, the latter further inverting the resulting signal. In other words, signal US(t) derived from multiplier 76 is equal to the square of UR(t), whereas the signal derived from multiplier 78 is equal, but with the reverse sign.

Signal −US(t), derived from multiplier 78, is then processed, in a conventional manner, by means of low-pass filter 80, then by sampling circuit 82.

In the device described, reader 16 is the master as regards the transponder. In other words, the reader can find out at any moment when a transponder is likely to respond to an interrogation. Just before the response signal begins, sampling circuit 82 stores the mean value of signal US−(t−Δt) provided by filter 80. It is this stored signal that is added to signal US(t). After amplification and filtering by amplifier-filter 72, then comparison by comparator 74, the result of this addition allows X(t), which includes all data derived from the transponder, to be extracted, whereas the signal originating from the carrier has been removed.

It is quite clear that the transponder and the reader as they have been described can be subject to numerous variants, without thereby departing from the scope of the invention.

Thus, although the carrier frequency is relatively low, and owing to the features of the reader according to the invention, used with transponders like that described, it is possible to read passive transponders in particularly unfavourable conditions, even through a metal screen, safely and quickly.

What is claimed is:

1. Reader (10) for identifying passive transponders (12) of the type including an antenna for receiving a first signal (Tx) from the reader and for transmitting a second signal (Rx), including:
    a time base (54) generating a sinusoidal signal,
    a control circuit (64),
    a modulator (56) for transmitting the data to the control circuit (64) for the purpose of modulating the sinusoidal signal in order to generate a signal carrying commands which, received by the antenna of said transponder, forms said first signal (Tx),
    a demodulator (58),
    a decoder (60),
    a communication interface (62), and
    an antenna (14),
    characterized in that said demodulator (60), which is connected to the antenna (14) to receive the second signal (Rx), includes two multipliers (76, 78), one (78) being of the inverter type, and an adder (70) arranged for combining the data originating from said multipliers (76, 78).

2. Reader according to claim 1, characterized in that said demodulator (58) further includes:

a first channel (66) formed of the first multiplier (76),
a second channel (68) arranged in parallel with said first channel (66) and including the second multiplier (78), as well as a low pass filter (80) and a sampling and hold circuit (82),
an amplifier-filter (72), and
a comparator (74),
said demodulator (58) being arranged such that the first (66) and second (68) channels are connected to said adder (70) and that the signals derived from the adder (70) are processed by the amplifier-filter (72) then by the comparator (74) and addressed to said interface (62) to deliver, at the output thereof, a decoded item of data originating from said transponder (12).

3. Reader according to claim 1, characterized in that said antenna is formed of a coil wound around a core of soft magnetic material.

4. Reader according to claim 1, characterized in that it is arranged such that the signal (Lx) pause occurs by interrupting the current during its zero crossing.

5. Reader according to claim 1, characterized in that it is arranged such that said first signal (Tx), generated by the control circuit, is formed of a succession of bits between each of which a pause is inserted, the duration of the pause being less than or equal to six periods of the sinusoidal signal.

6. Reader according to claim 1, characterized in that said demodulator further comprises:
a first channel comprising the first multiplier; and
a second channel arranged in parallel with said first channel and comprising the second multiplier, as well as a low pass filter and a sampling and hold circuit.

7. A reader for identifying passive transponders of the type including an antenna for receiving a first signal from the reader and for transmitting a second signal, comprising:
a time base that generates a sinusoidal signal;
a modulator that transmits data;
a control circuit arranged to receive the sinusoidal signal from the time base and the data from the modulator, the control circuit producing as an output a modulated carrier signal based on the sinusoidal signal and the data;
an antenna that receives as an input the modulated carrier from the control circuit and transmits the modulated carrier as the first signal;
a demodulator connected to receive as an input a modulated said second signal transmitted to the antenna; and
a decoder connected to receive an output of the demodulator;
wherein the demodulator comprises:
first and second multipliers, each of the first and second multipliers receiving the modulated second signal, the first multiplier being non-inverting, the second multiplier being inverting; and
an adder arranged to receive an output of the first multiplier and an output of the second multiplier.

8. The reader of claim 7, wherein the demodulator further comprises a low pass filter and a sample-and-hold circuit arranged to receive an output of the second multiplier.

9. The reader of claim 8, wherein the demodulator further comprises:
an amplifier-filter arranged to receive an output of the adder; and
a comparator arranged to receive an output of the amplifier-filter.

10. The reader of claim 8, wherein the antenna comprises a coil wound around a core of soft magnetic material.

11. The reader of claim 7, wherein the antenna comprises a coil wound around a core of soft magnetic material.

12. A reader for identifying passive transponders of the type including an antenna for receiving a first signal from the reader and for transmitting a second signal, comprising:
a time base that generates a sinusoidal signal;
a modulator that transmits data;
a control circuit arranged to receive the sinusoidal signal from the time base and the data from the modulator, the control circuit producing as an output a modulated carrier signal based on the sinusoidal signal and the data;
an antenna that receives as an input the modulated carrier from the control circuit and transmits the modulated carrier as the first signal;
a demodulator connected to receive as an input a modulated said second signal transmitted to the antenna; and
a decoder connected to receive an output of the demodulator;
wherein the demodulator comprises:
first and second multipliers, each of the first and second multipliers receiving the modulated second signal, the first multiplier being non-inverting, the second multiplier being inverting;
a low pass filter receiving an out put of the second multiplier; and
an adder arranged to receive an output of the first multiplier and a sampled output of the low pass filter.

13. The reader of claim 12, wherein the demodulator further comprises a low pass filter and a sample-and-hold circuit arranged to receive an output of the second multiplier.

14. The reader of claim 13, wherein the demodulator further comprises:
an amplifier-filter arranged to receive an output of the adder; and
a comparator arranged to receive an output of the amplifier-filter.

15. The reader of claim 13, wherein the antenna comprises a coil wound around a core of soft magnetic material.

16. The reader of claim 12, wherein the antenna comprises a coil wound around a core of soft magnetic material.

* * * * *